(12) United States Patent
March

(10) Patent No.: US 9,740,717 B2
(45) Date of Patent: Aug. 22, 2017

(54) METHOD OF OPERATION FOR A HIERARCHICAL FILE BLOCK VARIANT TRACKER APPARATUS

(71) Applicant: Roger March, Santa Clara, CA (US)

(72) Inventor: Roger March, Santa Clara, CA (US)

(73) Assignee: IC Manage Inc., Campbell, CA (US)

( * ) Notice: Subject to any disclaimer, the term of this patent is extended or adjusted under 35 U.S.C. 154(b) by 0 days.

(21) Appl. No.: 15/236,543

(22) Filed: Aug. 15, 2016

(65) Prior Publication Data

US 2016/0350340 A1 Dec. 1, 2016

Related U.S. Application Data

(62) Division of application No. 14/266,830, filed on May 1, 2014, now Pat. No. 9,594,782.

(51) Int. Cl.
*G06F 17/30* (2006.01)

(52) U.S. Cl.
CPC .... *G06F 17/30309* (2013.01); *G06F 17/3023* (2013.01); *G06F 17/30091* (2013.01); *G06F 17/30212* (2013.01)

(58) Field of Classification Search
CPC ........... G06F 17/30309; G06F 17/3023; G06F 17/30212; G06F 17/30091; G06F 17/30353
See application file for complete search history.

(56) References Cited

U.S. PATENT DOCUMENTS

| | | | | |
|---|---|---|---|---|
| 7,539,943 | B2 * | 5/2009 | Vaidyanathan | G06F 8/71 715/744 |
| 8,489,654 | B2 * | 7/2013 | Guarraci | G06F 17/30233 707/825 |
| 9,594,782 | B2 * | 3/2017 | March | G06F 17/30309 |
| 2005/0066095 | A1 * | 3/2005 | Mullick | G06F 17/30171 710/200 |
| 2006/0271395 | A1 * | 11/2006 | Harris | G06F 9/52 718/1 |
| 2007/0271317 | A1 * | 11/2007 | Carmel | G06F 17/30575 |
| 2008/0163302 | A1 * | 7/2008 | Khedouri | G06F 17/30094 725/46 |
| 2009/0319580 | A1 * | 12/2009 | Lorenz | G06F 8/71 |
| 2011/0055298 | A1 * | 3/2011 | Wade | G06F 11/1435 707/827 |
| 2011/0072062 | A1 * | 3/2011 | Guarraci | G06F 17/30233 707/831 |

(Continued)

*Primary Examiner* — Leslie Wong
(74) *Attorney, Agent, or Firm* — Patentry

(57) ABSTRACT

A system and apparatus intermediates between a centralized remote file service and several distributed virtual machine data center servers. When several file blocks are committed by applications running in virtual machines, they are aggregated together into a fewer number of file write operations to exploit the parallelism of multi-disk arrays. Requests for frequently retrieved file blocks are redirected to the location of the freshest retention. Each data center has a non-transitory file block store locally attached which provides images of virtual machines, applications, and data. Each file block librarian provides a file system view to each virtual machine. Several Virtual Machine Data Centers are coordinated by a tracker that locates, redirects, and retrieves any file block of any version of any file within its name space.

8 Claims, 8 Drawing Sheets

(56) References Cited

U.S. PATENT DOCUMENTS

| | | | | |
|---|---|---|---|---|
| 2011/0126099 A1* | 5/2011 | Anderson | H04L 9/3213 | 715/704 |
| 2012/0054253 A1* | 3/2012 | Guarraci | G06F 17/30283 | 707/825 |
| 2012/0179874 A1* | 7/2012 | Chang | G06F 9/45558 | 711/128 |
| 2012/0278450 A1* | 11/2012 | Soltis | G06F 3/0605 | 709/219 |
| 2013/0174124 A1* | 7/2013 | Watters | G06F 8/71 | 717/122 |
| 2013/0262405 A1* | 10/2013 | Kadatch | G06F 9/5072 | 707/692 |
| 2016/0357780 A1* | 12/2016 | March | G06F 17/30309 | |

* cited by examiner

METHOD OF OPERATION FOR A HIERARCHICAL FILE BLOCK VARIANT TRACKER APPARATUS

CROSS-REFERENCE TO RELATED APPLICATIONS

This is a DIVISION application of currently pending Ser. No. 14/266,830 filed May 1, 2014, in turn, a continuation in part application of Ser. No. 14/138,663 filed Dec. 23, 2013 which is incorporated in its entirety by reference and claims the priority thereof.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISK OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR OR A JOINT INVENTOR

Not Applicable

BACKGROUND OF THE INVENTION

The field of the invention is within Electrical Computers and Digital Processing Systems: Memory, appropriate subclasses for accessing, controlling, storing or writing to, retrieving or reading from memories that are peripherals.

It is known that each one of many networked user workstation apparatuses may commit a file into the variant controlled file system by storing a version tracking record for each change log and content point for each block of the file into its local file system view store, and transmitting a version tracking record to a network attached file state ledgerdemain store. Each user workstation displays a file system view of every variant of every file in the file system for selection. When required, the workstation applies change logs to content points according to first a local file system view store for a version tracking record, then requesting and comparing version tracking records from confederated repositories at other user workstation apparatuses, and if unsatisfied, obtains a version tracking record from a network attached file state ledgerdemain store. Even so, congestion has been observed when files are written to a centralized file server or service.

It is known is that modern file systems provide high throughput by parallelism to essentially fulfill multiple file block operations in the same wall clock time as fulfilling a single file block operation when the blocks are in the same file. It is known that modern data centers utilize servers having multi-core processor by restoring a virtual machine operating system in each core, instantiating an application (app) in each virtual machine (vm), and provision file blocks necessary for performing a task, transaction, transformation, or verification. At the conclusion of the application instance, the resulting output is retained and the intermediate results and state of the virtual machine and application are discarded to enable a clean processor core and memory space for the next vm and app instantiation.

It is appreciated that because the data input and output operations across a group of processor cores is asynchronous based on their availability after completion of a previous task, the file block operations seems random and degrades the performance of a file system far below optimum. Thus, it can be appreciated that what is needed is quicker provisioning of an operating system and an application into each of a plurality of processor cores; unrestricted accessibility to versioned file block assets between any processor resource and any storage resource; and rapid release and sterilization of resources when a task is accomplished.

SUMMARY OF THE INVENTION

A tracker apparatus reads and writes one or more file blocks of a file to or from a remote file system on behalf of several file block librarian (librarian) circuits. The tracker keeps a record of where the fulfilled file blocks requests reside among the librarian circuits. Requests for a file block are redirected to a librarian which has a specific version. The tracker provides a file commit acknowledgement when a virtual machine requires it to release its resources. The tracker controls ownership of a name space but may delegate a name subspace to a librarian.

Each librarian serves a virtual machine data center by presenting a file system view to each virtual machine. Each virtual machine reads and writes file blocks to the librarian through interprocess communication (IPC). The librarian is coupled to a non-transitory data center file block store which has all the versions written by its virtual machines. Each librarian may obtain an other version of a file block from a peer librarian which is coupled to another file block store. Only when a librarian cannot locate a desired file block among its peer librarians, does a read request go to its tracker. When a virtual machine commits a file, the write request goes both to the tracker and to the local file block store. The virtual machine is released upon receipt from the tracker of a file block write acknowledgement.

When a virtual machine completes its assignment and receives a file block write acknowledgement from the tracker, all its intermediate files, vm state, and application state are discarded to enable a clean restore into its processor core and allocated memory. The virtual machine operating system image and application image is instantiated from the local file block store for its next assignment. A system and apparatus intermediates between a centralized remote file service and several distributed virtual machine data center servers. A centralized file server or cluster of servers may provide services as a cloud to distributed data centers by a wide area network.

When several file blocks are committed by applications running in virtual machines, they are aggregated together into a fewer number of file write operations to exploit the parallelism of multi-disk arrays. The file blocks may come from diverse data center locations. It improves efficiency to aggregate file block writes into a smaller number of file writes at the centralized file server(s). An application within a virtual machine may be released without risk of data loss as soon as the commitment has been acknowledged. The tracker has non-transitory storage to ensure that data will not be lost during aggregation.

Requests for frequently retrieved file blocks are redirected to the location of the freshest retention. When the tracker receives and distributes a requested file block, it stores the location for use by another librarian.

A file system view is presented to each virtual machine so that it may operate on any version of any file block. Each librarian has a record of the blocks in a file stored at its local file block store, the central file server, and at other librarians. Each virtual machine may modify these blocks in its own file system view without committing to the central file server.

Each data center has a non-transitory file block store locally attached which provides images of virtual machines, applications, and data. When a virtual machine completes its assignment, its processor core and allocated memory are restored with fresh images.

Each virtual machine data center has a file block librarian which provides a file system view to each new virtual machine. In embodiments, the librarian circuits are implemented by executing instructions in one of the virtual machine data center processor cores.

Several Virtual Machine Data Centers are coordinated by a tracker which manages all the assets in a name space. A tracker locates, redirects, and retrieves any file block within its name space. In embodiments, the tracker circuit has its own non-transitory storage and a processor executing instructions to perform a method.

BRIEF DESCRIPTION OF THE SEVERAL VIEWS OF THE DRAWINGS

The present invention will be understood more fully from the detailed description given below and from the accompanying drawings of various embodiments of the invention, which, however, should not be taken to limit the invention to the specific embodiments, but are for explanation and understanding only.

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE INVENTION

Figure 1:
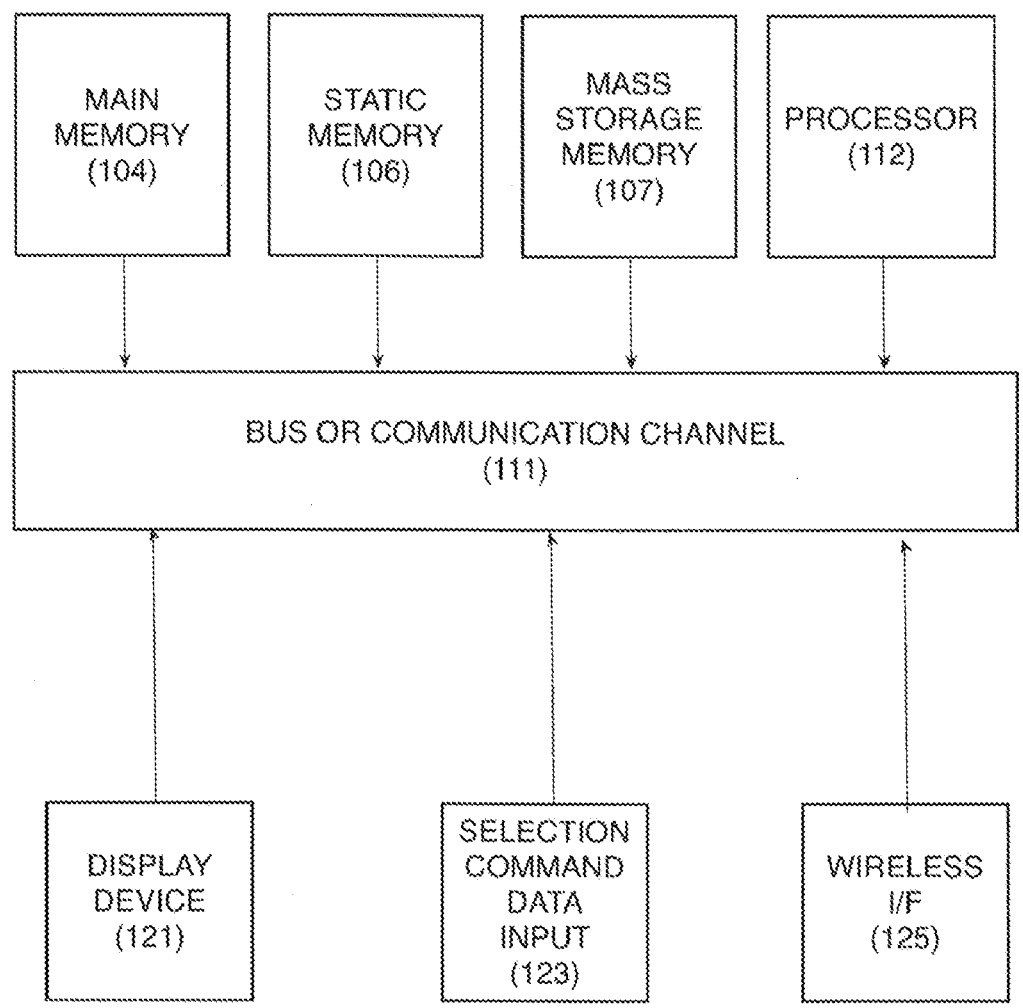
FIG. 1 is a block diagram of an exemplary computer system.

One aspect of the invention is a virtual machine data center system comprising a first Data Center File Block Librarian circuit coupled to a non-transitory Data Center File Block Store wherein the Librarian circuit is a processor core configured to present a File System View to a Virtual Machine of a Virtual Machine server.

In an embodiment the virtual machine data center system further has at least one virtual machine server which has a plurality of processor cores coupled to a shared random access memory store for data and instructions of virtual machines and applications.

In an embodiment, the virtual machine data center system is attached to a second virtual machine data center which has a second Data Center file Block Librarian circuit coupled to a second non-transitory Data Center File Block Store. Therefore, the File System View of the first Librarian displays the file blocks and locations of file blocks in both non-transitory Data File Block Stores.

Another aspect of the invention is a file block tracker (Tracker) apparatus communicatively coupled to a plurality of librarian circuits (Librarians) and communicatively coupled to a remote file service. In this aspect, the Tracker contains a buffer circuit to accumulate file block commits from one or more Librarians, a synch/semi-synch circuit to acknowledge file block commits from each Librarian, a file read/write circuit to request read and write operations of a plurality of file blocks of a file at the remote file service, a name space management circuit to locate file blocks in any attached Librarian or the remote file service, and a subspace delegation circuit to redirect queries from a first Librarian to a second Librarian.

Another aspect of the invention is a data center system having a first Data Center File Block Librarian (Librarian) circuit; coupled to a non-transitory Data Center File Block (DCFB) Store, wherein the Librarian circuit is a processor core configured to present a File System View (FSV) to a server.

In an embodiment the data center system also has at least one server with a plurality of processor cores; coupled to a shared random access memory store for data and instructions.

In an embodiment, the first data center system is coupled to a second data center having a second Librarian circuit coupled to a second non-transitory DCFB Store, wherein the File System View of the first Librarian displays the file blocks and locations of file blocks in both a first and a second non-transitory DCFB Stores.

Another aspect of the invention is a file block tracker (Tracker) apparatus communicatively coupled to a plurality of Librarian circuits and communicatively coupled to a remote file service, the Tracker having at least a buffer circuit to accumulate file block commits from one or more Librarian circuits; a synch/semi-synch circuit to acknowledge file block commits from each Librarian circuit; a file read/write circuit to request read and write operations of a plurality of file blocks of a file at the remote file service; a subspace name space management circuit to locate file blocks in any attached Librarian circuit or the remote file service; and a subspace delegation circuit to redirect queries from a first Librarian circuit to a second Librarian circuit.

Figure 2:
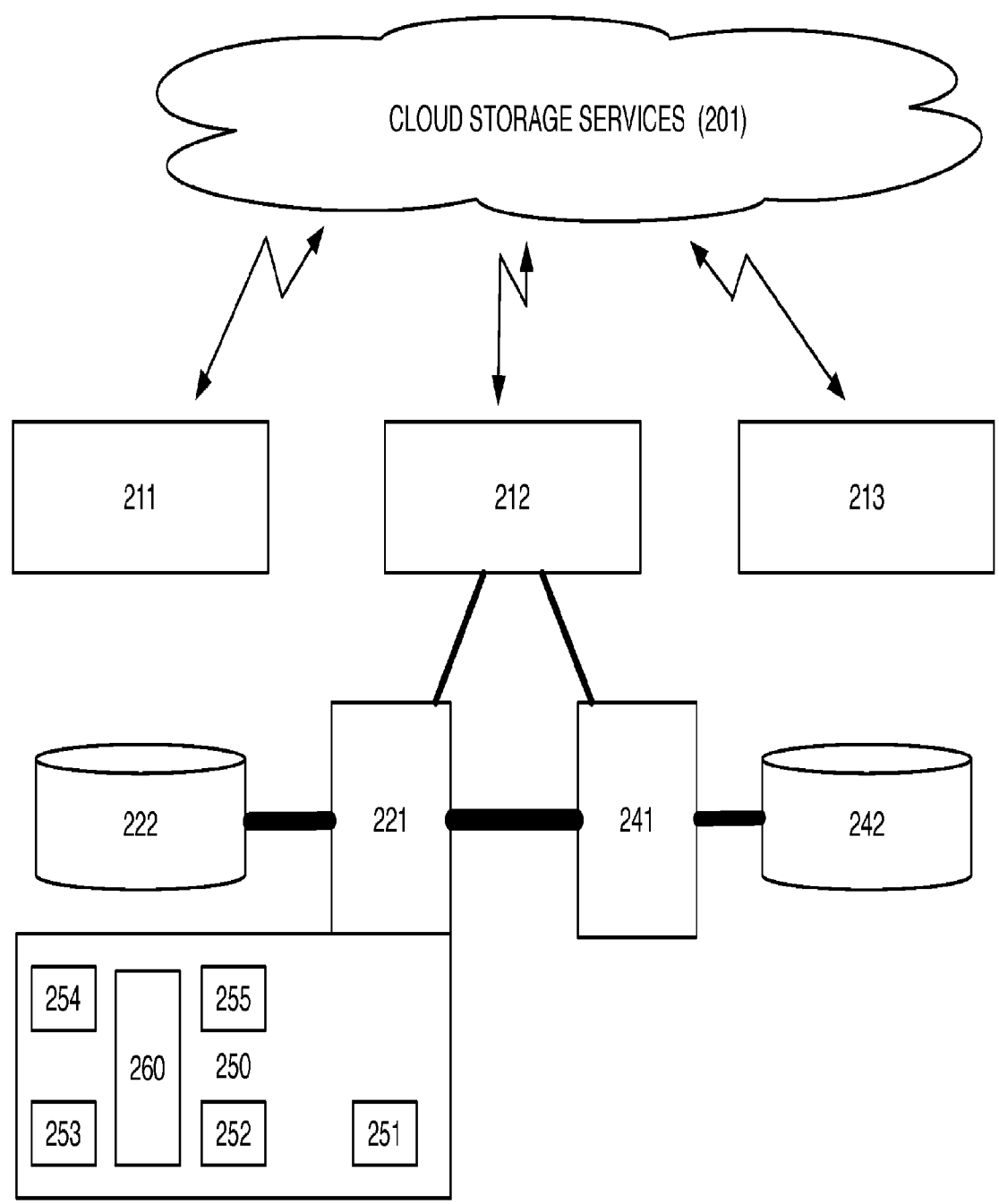
FIG. 2 is a block diagram of a system with data flows.

Referring now to FIG. 2, a block diagram of a system with data flows among components is shown. File Block Trackers 211-213 are communicatively coupled by a wide area network to Cloud Storage Services 201, which utilize any modern file system server. Each File Block Tracker is lord of a namespace which is available to a plurality of Peer Managers aka File Block Librarians 221, 241 which are well interconnected. Each File Block Librarian has a locally attached File Block Store 222, 241. A virtual machine data center 250 has storage 260 and a plurality of processor cores 251-255. Virtual Machine Images and User Application Images are stored in a local File Block Store 222 and provisioned to a core 251 when a virtual machine data center 250 allocates a core and storage 260 to a virtual machine. The File Block Librarian also provisions, through a data frame, a file system viewport personalized to the virtual machine instance.

Figure 3:
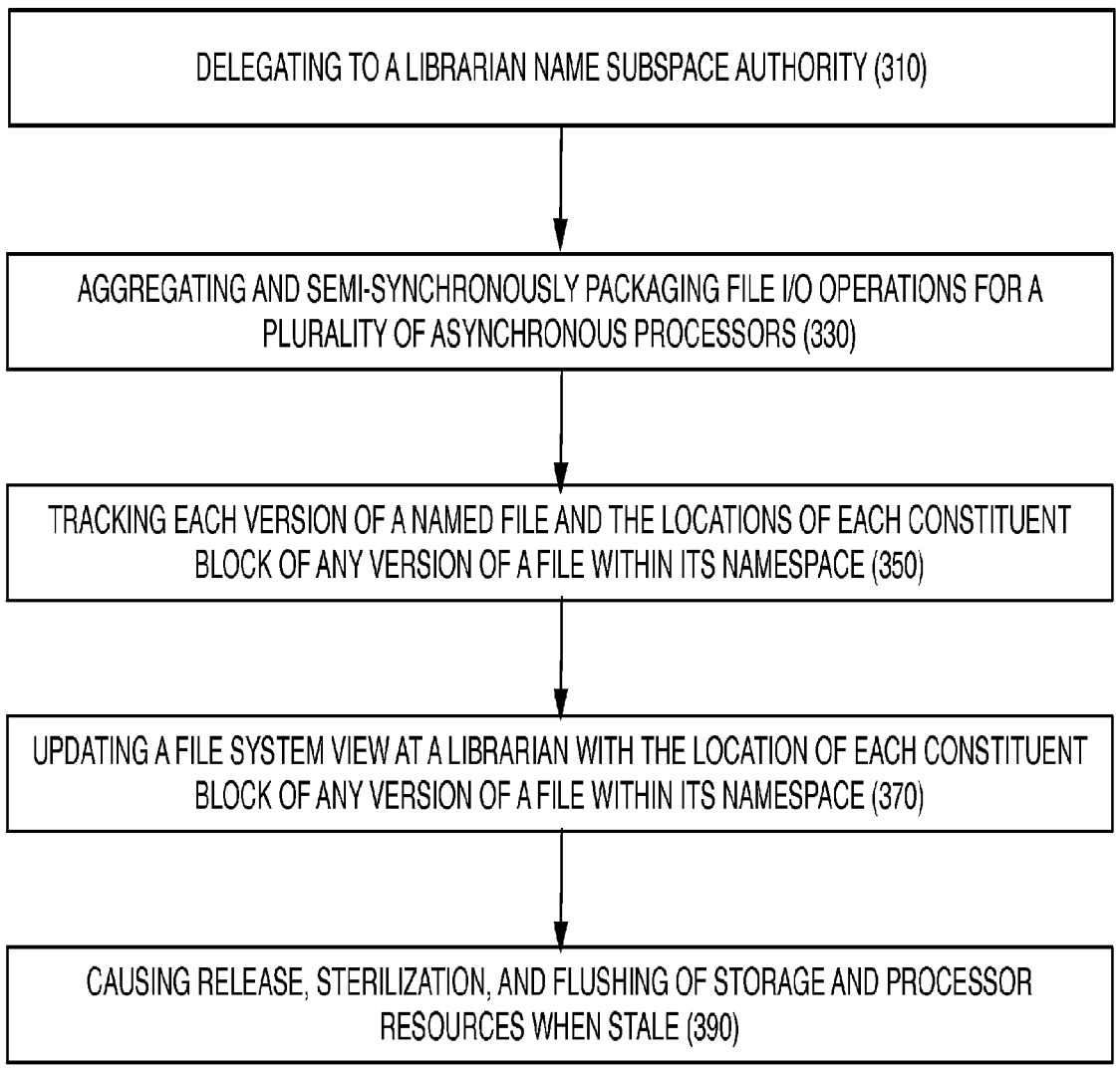
FIGS. 3-8 are flowcharts of method steps.

Another aspect of the invention is a method of operation for a file block tracker apparatus FIG. 3 by execution of instructions by a processor to perform: delegating to a librarian name subspace authority (310); aggregating and semi-synchronously packaging file I/O operations for a plurality of asynchronous processors 330; tracking each version of a named file and the locations of each constituent block of any version of a file within its namespace 350; updating a file system view at a librarian with the location of each constituent block of any version of a file within its namespace 370; and causing release, sterilization, and flushing of storage and processor resources when stale 390.

Figure 4:
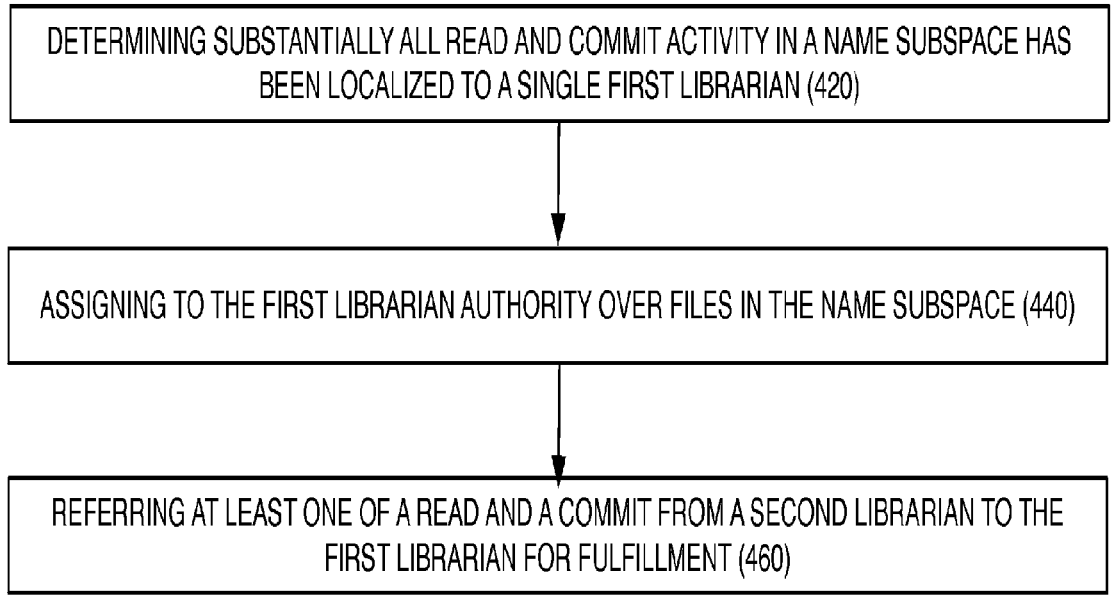

In an embodiment, delegating name subspace authority to a Librarian illustrated in FIG. 4 includes determining that substantially all read and commit activity to a plurality of files in a name subspace in a period has been localized to a single first Librarian 420; assigning to the first Librarian authority over a plurality of files in the name subspace 440; and referring at least one of a read and a commit from a second Librarian to the first Librarian for fulfillment 460.

Figure 5:
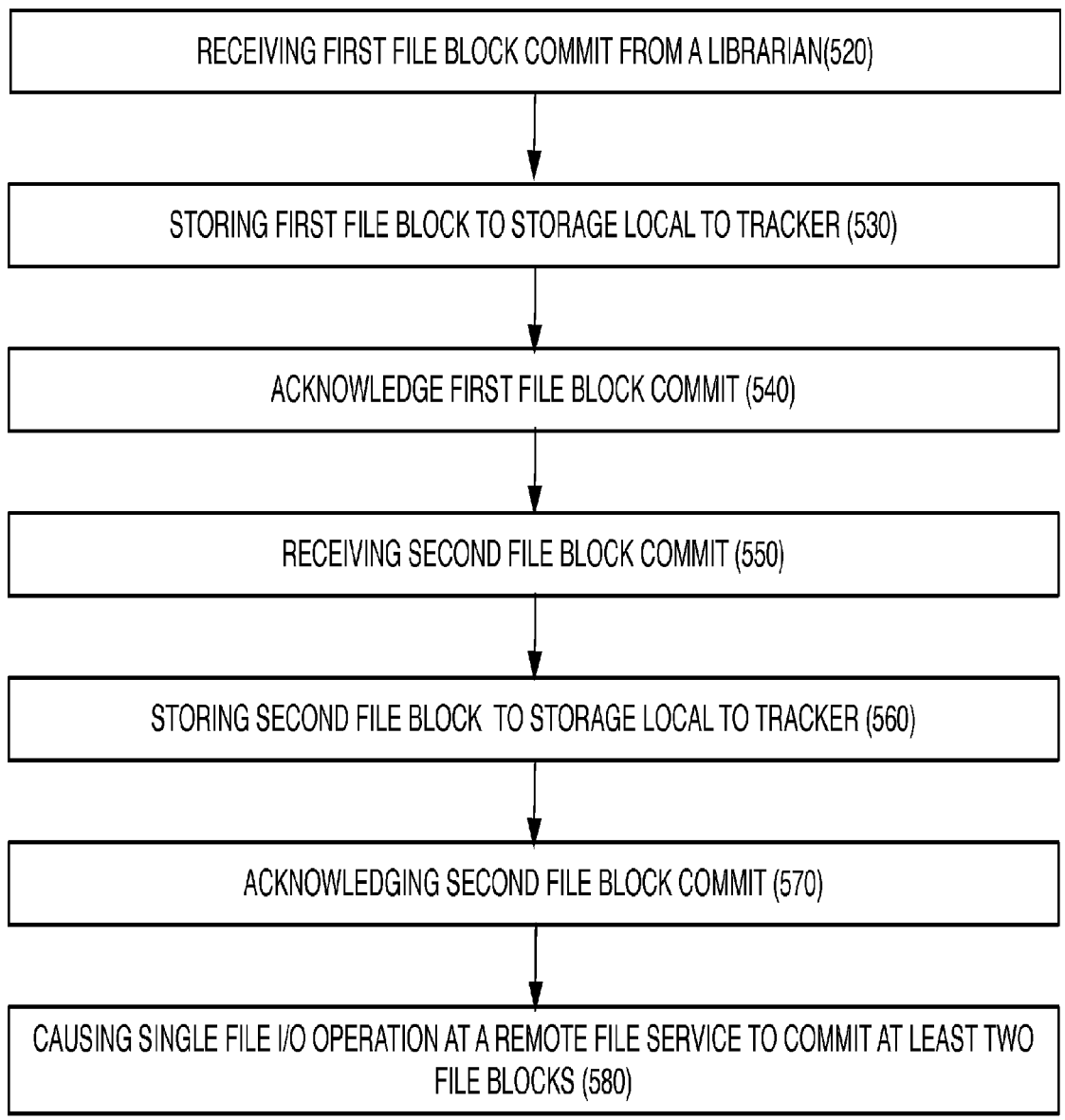

In an embodiment, aggregating and semi-synchronously packaging file I/O operations for a plurality of asynchronous processors as illustrated in FIG. 5 includes receiving a first file block commit for a first file from a first Librarian 520; storing the first file block to non-transitory storage local to the Tracker 530; acknowledging the first file block commit to the first Librarian whereby a processor resource is asynchronously released 540; receiving at least one second file block commit for a first file from a Librarian 550; storing the second file block commit to non-transitory storage local to the Tracker 560; acknowledging the second file block commit to the Librarian whereby a processor resource is asynchronously released 570; and causing a file I/O operation at a remote file service to commit at least two file blocks of a file 580.

Figure 6:
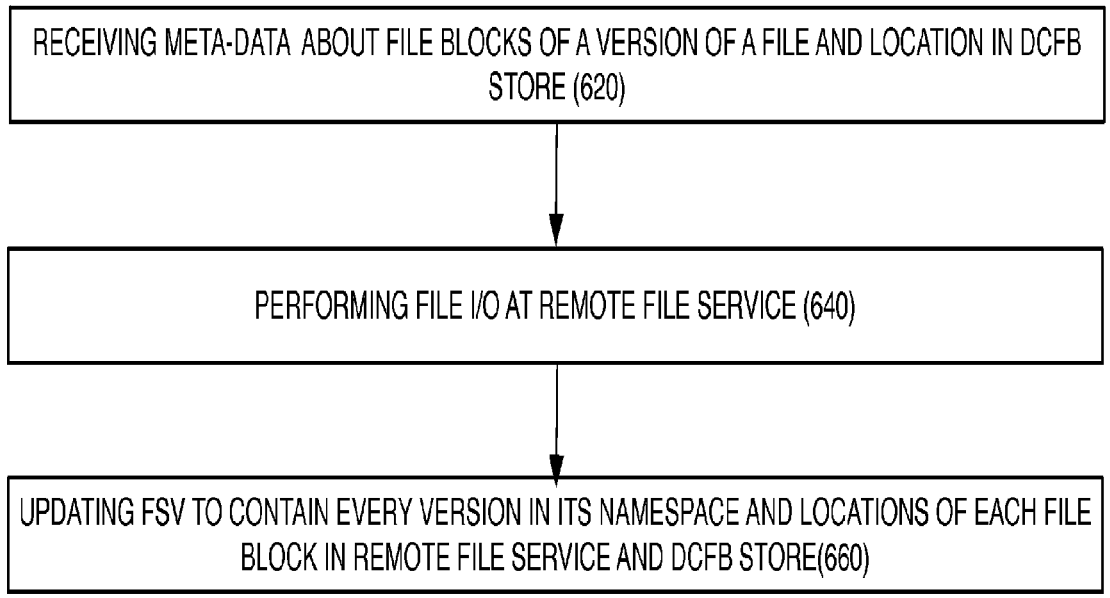

In an embodiment, tracking each version of a named file and the locations of each constituent block of any version of a file within its namespace as illustrated in FIG. 6 includes receiving from a first Librarian meta-data about the constituent file blocks of a version of a file within its namespace and the location of each constituent file block within a non-transitory DCFB Store 620; performing a file I/O operation at a remote file service to store a file block not previously stored in the remote file service 640; updating its file system view to contain every version of a file in its namespace and their constituent file blocks and the location(s) of each constituent file block in at least one of the remote file service and the non-transitory DCFB Store(s) 660.

Figure 7:
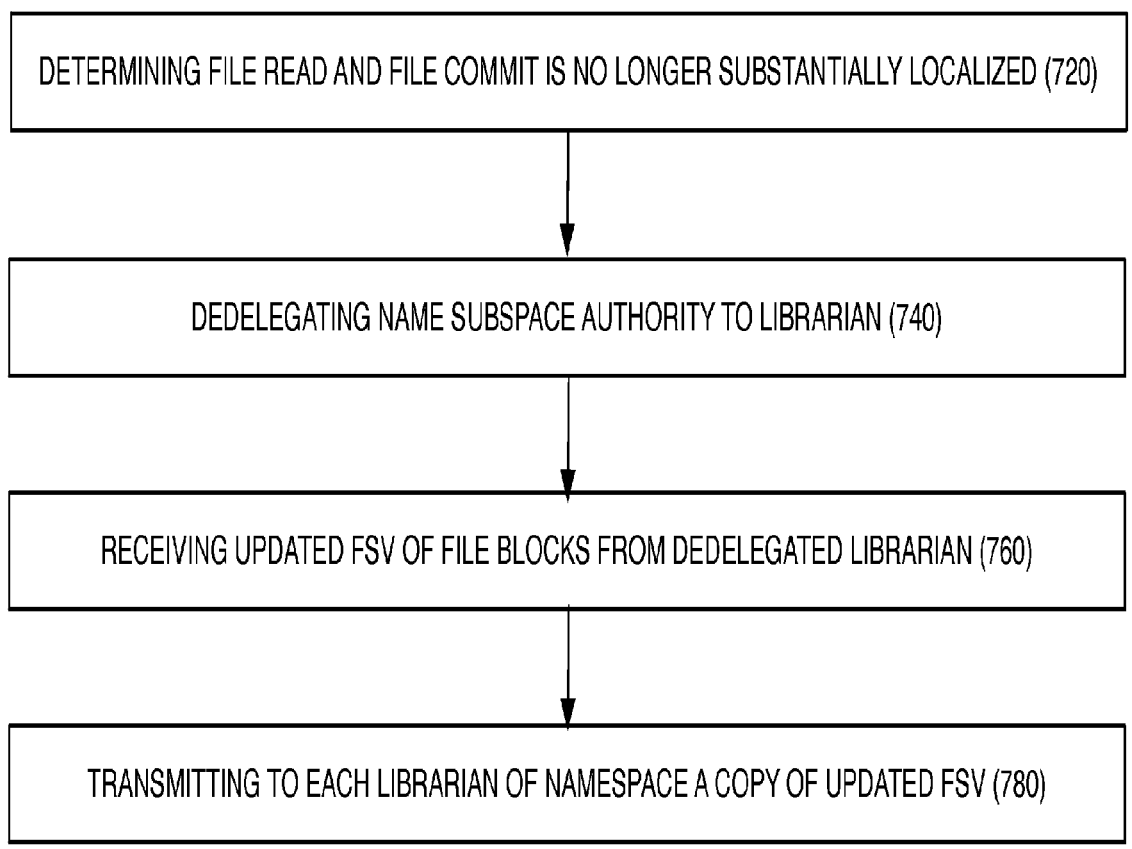

In an embodiment, updating a file system view at a Librarian with the location of each constituent block of any version of a file within its namespace FIG. 7 includes determining that file read and file commit activity for a name subspace is no longer substantially localized to a single Librarian 720; dedelegating name subspace authority to the Librarian 740; receiving an updated file system view containing meta-data describing each version of the files within the subspace and the location of every constituent file block from the dedelegated Librarian 760; and, transmitting to each Librarian of the namespace a copy of the updated file system view 780.

Figure 8:
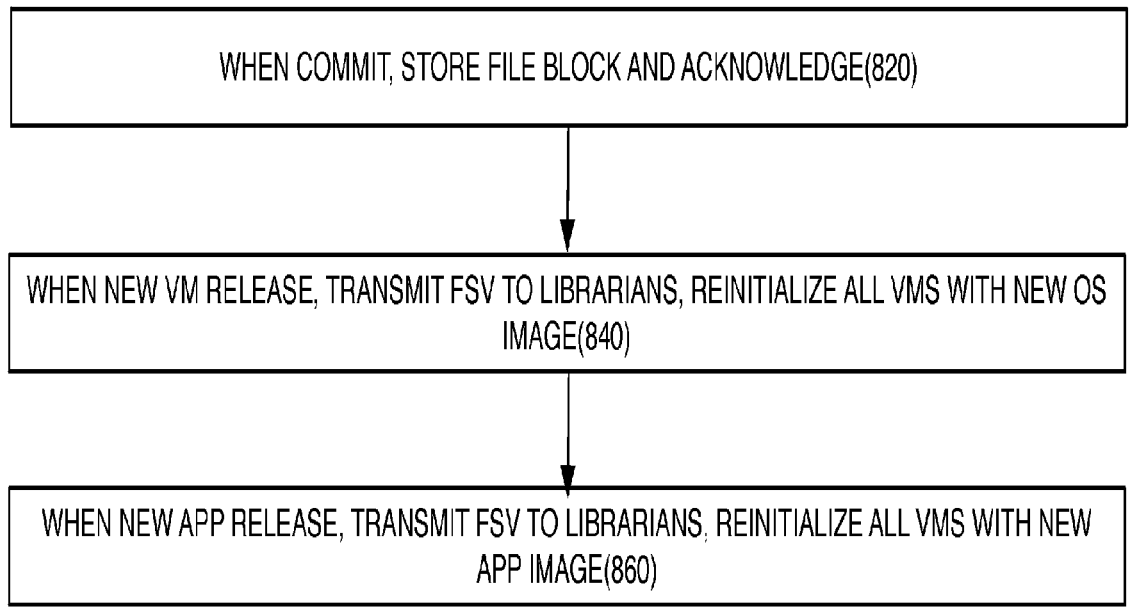

In an embodiment, causing release, sterilization, and flushing of storage and processor resources when stale as illustrated in FIG. 8 includes when a virtual machine process is complete and commits a file into a version control system, storing the new or modified file block into non-transitory storage and acknowledging the commit to the virtual machine, whereby the virtual machine may terminate, release all resources, and be reinitialized with a fresh image 820; when a virtual machine image has been superseded with a new release, transmitting a file system view to all librarians containing the new virtual machine image of an operating system, and causing all virtual machines to terminate and reinitialize using the new virtual machine image 840; when an application image has been superseded with a new release, transmitting a file system view to all Librarians containing the new image of an application, and causing all virtual machines to terminate and reinitialize using the new application image whereby cores and non-transitory stores of virtual machine data centers are flushed of stale releases of operating systems or applications 860.

A system and apparatus intermediates between a centralized remote file service and several distributed virtual machine data center servers.

When several file blocks are committed by applications running in virtual machines, they are aggregated together into a fewer number of file write operations to exploit the parallelism of multi-disk arrays. Aggregation is provided for file blocks of a plurality of files and a plurality of versions.

The Tracker apparatus receives requests for file blocks when a File Block Librarian cannot locate the requested version. The Tracker consolidates multiple file block reads or file block writes to minimize disk accesses of the conventional file system. The Tracker distributes file blocks received from conventional file system to the requesting file block Librarians and maintains a directory for future requests.

An application within a virtual machine may be released without risk of data loss as soon as the commitment has been acknowledged.

Requests for frequently retrieved file blocks are redirected to the location of the freshest retention.

A file system view is presented to each virtual machine so that it may operate on any version of any file block.

Each File Block Librarian (FBL) presents a Filesystem View Port (FVP) to its client virtual machines. In an embodiment this is done by IPC. The virtual machines request read or write access via its FVP. If the virtual machine is writing file blocks, its FVP diverges from other FVPs but any change may be discarded without being propagated to the cloud storage service.

Each data center has a non-transitory file block store locally attached which provides images of virtual machines, applications, and data.

When a virtual machine is popped open in a processor core of a first virtual machine data center, it requests a Filesystem View Port of files in a name space from its locally attached File Block Librarian apparatus. Virtual Machine images, User Application images, and data files are provisioned to each processor core by the File Block Librarian apparatus. In an embodiment, the File Block Librarian may be implemented in another virtual machine on a processor core.

Several Virtual Machine Data Centers are coordinated by a Tracker apparatus which manages all the assets in a name space.

A conventional file system is coupled to many virtual machine data centers by a File Block Tracker apparatus (Tracker) which is coupled to a plurality of File Block Librarian apparatuses.

Each data center has a file block Librarian which provides a file system view to each virtual machine.

Each first File Block Librarian apparatus has non-transitory file block storage and is communicatively coupled to at least one second File Block Librarian apparatus so that a requested file block may be provided from a first or a second non-transitory file block storage.

A Tracker locates, redirects, and retrieves any file block within its name space. The capabilities of the tracker apply to any file in its namespace, any version of any file in its namespace, any file block of any version, and can support multiple files and multiple versions simultaneously.

When committed into the file system, other virtual machines may access the new variant via one or more File Block Librarians. That is, file blocks committed into one File Block Librarian may be accessible via other communicatively coupled File Block Librarians (FBL). When a FBL fulfills a request for a file block access it retains a copy for subsequent requests from other virtual machines. The FBLs which are typically geographically clustered gossip among themselves exchanging FVP information.

A File Block Tracker (FBT) consolidates file access requests from a group of File Block Librarians (FBL) and prosecutes them through a cloud storage service to a File System server. Because of the parallelism utilized by modern file servers, multiple file block read requests may be fulfilled in nearly the same wall clock time as a single file block read or write request in the same file.

The File Block Tracker may operate in semi-synch or full synchronized mode. In fully synchronized mode, every change committed to any File Block is propagated from a Librarian to the Tracker. Upon acknowledgement, the operations at the virtual machine proceeds. This is the most costly but guarantees data integrity. In semi-synchronized mode, a tracker aggregates several file block writes, stores them to non-transitory media, and acknowledges to the application. In subspace delegation this function and control over a subspace is delegated to a Librarian. Updates to file blocks is eventually passed to the Tracker but the focus is on reads over writes. There is vulnerability to data loss if there is a crash of the Librarian which has been delegated subspace authority.

The File Block Tracker assists in exchanging Filesystem View Ports among File Block Librarians which are not directly communicatively connected.

Each Tracker defines a namespace for files. A Librarian may talk to multiple Trackers and be redirected to another Librarian for a desired file block.

In an embodiment, another processor or processor core may also host the File Block Librarian.

CONCLUSION

The present invention is easily distinguished from conventional file versioning software by the paralleling step for committing file blocks into a file system in one of synchronous mode or semi-synch mode by a name space tracker.

The present invention is easily distinguished by subspace delegation of portions of a name space by the tracker apparatus to a data center specific file block librarian.

The present invention is easily distinguished by enabling resources or virtual machines to be released upon a file commit acknowledgement by a tracker.

The techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

An Exemplary Computer System

FIG. 1 is a block diagram of an exemplary computer system that may be used to perform one or more of the functions described herein. Referring to FIG. 1, computer system 100 may comprise an exemplary client or server computer system. Computer system 100 comprises a communication mechanism or bus 111 for communicating information, and a processor 112 coupled with bus 111 for processing information. Processor 112 includes a microprocessor, but is not limited to a microprocessor, such as for example, ARM™, Pentium™, etc.

System 100 further comprises a random access memory (RAM), or other dynamic storage device 104 (referred to as main memory) coupled to bus 111 for storing information and instructions to be executed by processor 112. Main memory 104 also may be used for storing temporary variables or other intermediate information during execution of instructions by processor 112.

Computer system 100 also comprises a read only memory (ROM) and/or other static storage device 106 coupled to bus 111 for storing static information and instructions for processor 112, and a non-transitory data storage device 107, such as a magnetic storage device or flash memory and its corresponding control circuits. Data storage device 107 is coupled to bus 111 for storing information and instructions.

Computer system 100 may further be coupled to a display device 121 such a flat panel display, coupled to bus 111 for displaying information to a computer user. Voice recognition, optical sensor, motion sensor, microphone, keyboard, touch screen input, and pointing devices 123 may be attached to bus 111 or a wireless network 125 for communicating selections and command and data input to processor 112.

Note that any or all of the components of system 100 and associated hardware may be used in the present invention. However, it can be appreciated that other configurations of the computer system may include some or all of the devices in one apparatus, a network, or a distributed cloud of processors.

A number of embodiments of the invention have been described. Nevertheless, it will be understood that various modifications may be made without departing from the spirit and scope of the invention. For example, other network topologies may be used. Accordingly, other embodiments are within the scope of the following claims.

The invention claimed is:

1. A method of operation for a file block tracker apparatus comprising execution of instruction by a processor to perform, for any file block of any version of any file within its name space:
   delegating to a librarian name subspace authority by determining that substantially all read and commit activity to a plurality of files in a name subspace in a period has been localized to a single first librarian;
   assigning to the first librarian authority over a plurality of files in a name subspace; and
   referring at least one of a read and a commit from a second librarian to the first librarian for fulfillment;
      aggregating and semi-synchronously packaging file I/O operations for a plurality of asynchronous processors for at least one file block of any version of at least one file within its name space;
      tracking each version of a named file and the locations of each constituent block of any version of a file within its namespace;
      updating a file system view at a librarian with the location of each constituent block of any version of a file within its namespace; and
      causing release, sterilization, and flushing of storage and processor resources when stale.

2. The method of claim 1 wherein aggregating and semi-synchronously packaging file I/O operations for a plurality of asynchronous processors comprises: receiving a first file block commit for a first file from a first librarian; storing the first file block to non-transitory storage local to the tracker; acknowledging the first file block commit to the first librarian whereby a processor resource is asynchronously released; receiving at least one second file block commit for a first file from a second librarian; storing the second file block commit to non-transitory storage local to the tracker; acknowledging the second file block commit to the second librarian whereby a processor resource is asynchronously released; and causing a single file I/O operation at a remote file service to commit at least two file blocks of a file.

3. The method of claim 1 wherein tracking each version of a named file and the locations of each constituent block of any version of a file within its namespace comprises:
   receiving from a first librarian meta-data about the constituent file blocks of a version of a file within its namespace and the location of each constituent file block within a non-transitory Data Center File Block Store (DCFB Store);
   performing a file I/O operation at a remote file service to store a file block not previously stored in the remote file service; and
   updating its file system view to contain every version of a file in its namespace and their constituent file blocks and the location(s) of each constituent file block in at least one of the remote file service and the non-transitory DCFB Store(s).

4. The method of claim 1 wherein updating a file system view at a librarian with the location of each constituent block of any version of a file within its namespace comprises: determining that file read and file commit activity for a name subspace is no longer substantially localized to a single librarian; dedelegating name subspace authority to the librarian; receiving an updated file system view containing meta-data describing each version of the files within the subspace and the location of every constituent file block from the dedelegated librarian; and, transmitting to each librarian of the namespace a copy of the updated file system view.

5. The method of claim 1 wherein causing release, sterilization, and flushing of storage and processor resources when stale comprises: determining at least one of three conditions following, when a virtual machine process is complete and commits a file into a version control system, when a virtual machine image has been superceded with a new release; and when an application image has been superceded with a new release.

6. The method of claim 5 further comprising: when a virtual machine process is complete and commits a file into a version control system, storing the new or modified file block into non-transitory storage and acknowledging the commit to the virtual machine, whereby the virtual machine may terminate, release all resources, and be reinitialized with a fresh image.

7. The method of claim 5 further comprising: when a virtual machine image has been superceded with a new release, transmitting a file system view to all librarians containing the new virtual machine image of an operating system, and causing all virtual machines to terminate and reinitialize using the new virtual machine image.

8. The method of claim 5 further comprising: when an application image has been superceded with a new release, transmitting a file system view to all librarians containing the new image of an application, and causing all virtual machines to terminate and reinitialize using the new application image whereby cores and non-transitory stores of virtual machine data centers are flushed of stale releases of operating systems or applications.

* * * * *